(12) United States Patent
Mallick et al.

(10) Patent No.: US 10,655,331 B2
(45) Date of Patent: May 19, 2020

(54) WATER RESISTANT ROOFING UNDERLAYMENT

(71) Applicant: Tomahawk 30 Importers Ltd., Dublin (IE)

(72) Inventors: John Mallick, Wicklow (IE); Rufus Aylwin, Beaverton, OR (US)

(73) Assignee: Tomahawk 30 Importers Ltd., Dublin (IE)

( * ) Notice: Subject to any disclaimer, the term of this patent is extended or adjusted under 35 U.S.C. 154(b) by 111 days.

(21) Appl. No.: 15/934,779

(22) Filed: Mar. 23, 2018

(65) Prior Publication Data

US 2019/0292789 A1    Sep. 26, 2019

(51) Int. Cl.
| | |
|---|---|
| *E04D 12/00* | (2006.01) |
| *B32B 5/02* | (2006.01) |
| *B32B 27/12* | (2006.01) |
| *B32B 11/10* | (2006.01) |
| *E04D 5/10* | (2006.01) |

(52) U.S. Cl.
CPC ............ *E04D 12/002* (2013.01); *B32B 5/022* (2013.01); *B32B 5/024* (2013.01); *B32B 11/10* (2013.01); *B32B 27/12* (2013.01); *B32B 2307/7265* (2013.01); *B32B 2307/744* (2013.01); *B32B 2419/06* (2013.01); *E04D 5/10* (2013.01)

(58) Field of Classification Search
CPC ......... E04D 12/002; E04D 5/10; B32B 5/022; B32B 5/024; B32B 11/10; B32B 27/12; B32B 2307/7265; B32B 2307/744; B32B 2419/06
See application file for complete search history.

(56) References Cited

U.S. PATENT DOCUMENTS

| | | | | | |
|---|---|---|---|---|---|
| 4,588,634 | A | * | 5/1986 | Pagen | D06N 5/00 427/389.8 |
| 4,755,409 | A | * | 7/1988 | Harkness | B32B 11/10 428/40.3 |
| 6,360,506 | B1 | * | 3/2002 | Graae | D06N 5/00 52/408 |
| 2006/0141191 | A1 | * | 6/2006 | Seth | B32B 3/16 428/40.1 |
| 2017/0114542 | A1 | | 4/2017 | Khan et al. | |

* cited by examiner

*Primary Examiner* — Patricia L. Nordmeyer
(74) *Attorney, Agent, or Firm* — Berkeley Law & Technology Group, LLP

(57) ABSTRACT

An article comprising a water resistant underlayment portion is provided comprising a first non-woven fabric layer, a film layer, a first bituminous material layer, a second non-woven fabric layer, a woven fabric layer, and a second bituminous material layer.

28 Claims, 8 Drawing Sheets

WATER RESISTANT ROOFING UNDERLAYMENT

BACKGROUND

1. Field

Subject matter disclosed herein relates to a water resistant roofing underlayment material.

2. Information

A building and/or other building-type structure may include a surface, such as a roof, comprising plywood, some other wood, stone, and/or a brick-type material, for example. Roof shingles and/or tiles (hereinafter, "roofing") may be disposed above a plywood surface, for example, to protect the plywood from water, moisture, or weather-related elements and/or temperature-related elements. A "roof," as used herein refers to an externally exposed top surface of a building and/or other structure.

A roof of a building and/or other building-type structure may become damaged if water and/or moisture seeps through, such as to plywood that may be beneath the roofing, such as roof shingles and/or tiles. For example, if a roof has a relatively shallow pitch, water may pool in certain locations of the roof such as during a rainstorm and/or after ice that has accumulated on the roof during winter months begins to melt. In order to protect structural materials, for example, of a building underneath a roof, an underlayment may be disposed between such materials and roofing, for example.

A water resistant underlayment may reduce risk of water damage to a roof of a structure and/or may also reduce an impact of moisture on a roof of a structure. For example, roofing tiles may not necessarily include water resistant material by themselves, but may be utilized in combination with a water resistant underlayment to form a relatively water resistant barrier.

A roofing contractor may install (e.g., lay) an underlayment above (e.g., on top of) plywood of a building and may place roofing over (e.g., on top of) the underlayment. Furthermore, during installation, a roofing contractor may walk on the underlayment during roofing installation above (e.g., on top of) the underlayment. If the underlayment has a relatively low coefficient of friction, the roofing contractor may slip, particularly for a relatively steep pitch (e.g., incline), potentially running the risk of great bodily harm (e.g., injury), for example, if the roofing contractor were to slip off the building. Moreover, if an underlayment is not sufficiently strong, the underlayment may tear as a roofing contractor attempts to secure the underlayment, potentially resulting in increased costs and/or wasted (e.g., unusable) materials.

Furthermore, a roofing contractor may use staples, in some cases, to secure an underlayment. However, if the underlayment is not water resistant, moisture (e.g., water) may seep through the underlayment in certain weather conditions, potentially damaging materials disposed below (e.g., under) the underlayment.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
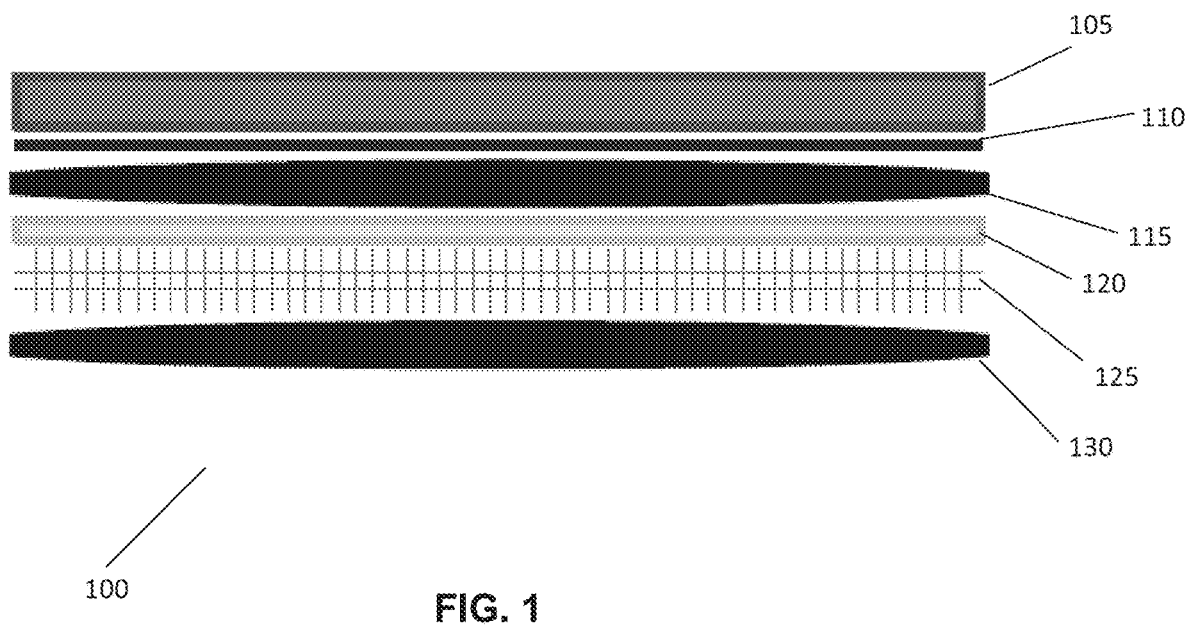
FIG. 1 illustrates a water resistant underlayment according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

References throughout this specification to a portion or one portion of an underlayment, and/or the like means at least a portion of the underlayment. For example, a portion may comprise an entirety or a part of an underlayment less than the entirety, in accordance with an embodiment. References throughout this specification to an underlayment refer to an entirety of the underlayment or a portion thereof.

A roof may employ an incline and/or decline, such as for adequate drainage. Likewise, an underlayment, such as a water resistant underlayment, may be provided. In an embodiment, a water resistant underlayment may be relatively high-strength, wind-resistant, and/or skid-resistant in accordance with an embodiment. Likewise, an embodiment may comprise various layers, as discussed further below. Furthermore, a water resistant underlayment may be packaged in a roll of material to allow a roofing contractor to unroll a strip thereof onto a surface of a material, such as a plywood surface of a structure such as a house or building, in accordance with an embodiment, to allow for relatively more convenient installation. A water resistant underlayment may include a layer of asphalt and/or tar which may comprise a relatively sticky surface which may adhere to a surface of a building, which may comprise a material, such as plywood, brick, stone, and/or some other suitable material, in accordance with an embodiment.

An inner core of an underlayment or a portion of an underlayment in an embodiment may act as a binder for outer layers and may be relatively water resistant, such as through use of a thermoplastic, resinous, wax, and/or polymeric material. Various materials may be used to provide a relatively water resistant barrier inner core, such as asphalt, tar, polyethylene terephthalate (PET), polyvinyl chloride (PVC), pine pitch, polypropylene, polyethylene, polyamides, polyester, nylon, or a combination thereof, for example. In an embodiment, an inner core may comprise a thermoplastic including a bituminous material such as asphalt and/or tar to utilize some of the advantageous features of such material, including physical properties, usability, and/or relatively inexpensive cost.

A water resistant underlayment embodiment, as discussed above, may be utilized for roofs having relatively steep inclines as well as for roofs having relatively shallow inclines. Use of an embodiment of a water resistant underlayment may be beneficial, for example, in a geographic region which may be relatively chilly and/or experience weather conditions involving rain, ice, and/or snow.

FIG. 1 illustrates an embodiment 100 of a water resistant underlayment. Embodiment 100 may include several layers such as illustrated, in which an embodiment 100 consists of, consists essentially of, or alternatively, includes a first non-woven fabric layer 105, a film layer 110, a first bituminous material layer 115, a second non-woven fabric layer 120, a woven fabric layer 125, and a second bituminous layer 130.

Of course, an order or arrangement of layers, as shown in FIG. 1, is merely one example embodiment, and layers may be arranged in a different order, for example, in some embodiments. Moreover, in one or more embodiments, additional layers of material may be included consistent with claimed subject matter scope.

For the sake of convenience, various layers of underlayment embodiment 100 are illustrated in FIG. 1 as having similar thickness (e.g., relatively uniform). However, it should be appreciated that in some embodiments relative thicknesses of different layers may differ based at least in part on a particular application, and/or other potential features, including cost, desired features, etc., for example. Nevertheless, variations such as the foregoing are intended to be included within claimed subject matter scope.

First non-woven fabric layer 105 and/or second non-woven fabric layer 120 may comprise a non-woven fabric material such as a polyester fiber non-woven fabric, such as a cloth, in an embodiment. First non-woven fabric layer 105 and/or second non-woven fabric layer 120 may have various properties, features, and/or benefits such as relatively good and/or improved moisture resistance, relatively good air permeability, relatively good flexibility, relatively light weight, relatively non-combustion-supporting properties, relatively high decomposability, relatively non-toxic and/or relatively non-irritating property, relatively inexpensive or low price, recyclability and reusability, increased strength, and so forth, as compared to an underlayment lacking one or more non-woven fabric layers, to name just a few examples among many possibilities. Use of first non-woven fabric layer 105 and/or second non-woven fabric layer 120 may have additional features and/or benefits, such as a relatively short process flow (e.g., relatively quick manufacturing speed), relatively high yield, relatively low cost, and/or may be formed of various materials, that may reduce cost or weight of underlayment embodiment 100. First non-woven fabric layer 105 and/or second non-woven fabric layer 120 may additionally provide enhanced skid resistance, such as with a relatively high coefficient of friction, a relatively strong resistance to ultraviolet light, and/or a larger useful life, as compared to an underlayment lacking one or more non-woven fabric layers, for example. Accordingly, first non-woven fabric layer 105, via an increased friction coefficient, may improve skid resistance, for example, so that a roofer (e.g, roofing constructor) may be relatively less likely to slip, such as during installation, to thereby potentially improve construction safety at construction sites, such as in connection with installation, particularly for sloped roofs. As mentioned, first non-woven fabric layer 105 may additionally improve resistance to ultra violet (UV) resistance and/or improve useful life of underlayment embodiment 100, for example. Typically, underlayment embodiment 100, for example, shown in FIG. 1, may be installed in a manner so that layer 105 is more remote from a building structure and less remote from roofing, relative to other layers of underlayment embodiment 100.

In an embodiment, non-woven fabric layer 105 may comprise a polyester fiber non-woven fabric, for example. In some embodiments, non-woven fabric layer 105 may comprise a cloth material other than polyester, such as nylon and/or a combination thereof, for example.

A film layer 110 may be disposed between first non-woven fabric layer 105 and first bituminous material layer 115, in an embodiment. Film layer 110 may comprise a glue and/or a relatively thin plastic, for example, to adhere and/or form a bond between first non-woven fabric layer 105 and first bituminous layer 115, in an embodiment. Film layer 110 may, for example, be sprayed or otherwise coated onto first non-woven fabric layer 105 or onto first bituminous layer 115 and the layers may be joined in a manner so that, as a result of drying, first non-woven fabric layer 105 and first bituminous layer 115 may bond together, for example. In an embodiment, film layer 110 may be sprayed on one or more of first non-woven fabric layer 105 and/or first bituminous layer 115 by a machine. For example, film layer 110 may form a protective layer to resist seepage of a liquid, such as water, through first non-woven fabric layer 105 to first bituminous layer 115, in an embodiment. In an embodiment, film layer 110 may be considered to comprise a water resistant barrier (e.g., resistant to moisture external to a building structure) in the form of a filament. Film layer 110 may also reduce bleeding of tar and/or asphalt from first bituminous layer 115 through to first non-woven fabric layer 105. If film layer 110 were omitted, in an embodiment, tar and/or asphalt from first bituminous layer 115 otherwise might seep through first non-woven fabric layer 105. Likewise, a roofing contractor might, during installation, get tar and/or asphalt on his or her work boots, potentially producing an undesirable mess.

In an embodiment, first bituminous layer 115 and/or second bituminous layer 130 may comprise an asphalt and/or tar material, for example. For example, first bituminous layer 115 and/or second bituminous layer 130 may comprise a mixture having styrene-butadiene-styrene (SBS) so as to make a tar and/or asphalt material, which may be relatively rubber-like. For example, an addition of SBS polymers to bitumen may improve thermal and/or durability properties of underlayment embodiment 100. SBS may enhance plasticity, resistance to relatively low temperatures, resistance to relatively high temperatures, as well as improve useful life, to name just a few potential benefits among many possibilities.

In an embodiment, second bituminous layer 130 may include a release or removable layer which may be peeling off by a roofer, in a manner like a cellophane layer, discussed in more below with respect to FIGS. 3 and 4. For example, a removable layer may be peeled off to expose an adhesive layer or surface which a roofer may utilize to adhere underlayment embodiment 100 to a surface of a roof. In one particular embodiment, a removable layer may be disposed along a bottom surface of a roll of underlayment embodiment. If the roofer has positioned a roll of underlayment embodiment, the roofer may subsequently peel back or otherwise remove a removable layer to expose an adhesive material or layer which may be utilize to adhere the underlayment embodiment to a surface of a roof.

In an implementation, an underlayment embodiment 100 may be placed or installed on a roof, and a roofing contractor may subsequently hammer nails there through to secure roofing, such as tiles and/or shingles. First bituminous layer 115 and/or second bituminous layer 130, in an embodiment, may include a relatively thick tar to assist in sealing, such as nails. Thus, if nails have been hammered through first bituminous layer 115 and/or second bituminous layer 130, tar and/or asphalt from first bituminous layer 115 and/or second bituminous layer 130 may form a seal with respect to the nails to reduce likelihood of penetration of moisture. First bituminous layer 115 and/or second bituminous layer 130, in an embodiment, may include a rubber material (e.g., rubber mulch), such as ground-up tires and/or recycled rubber material coated with a relatively thick tar. Recycled rubber material (e.g., ground-up tires) may be used, for example, to produce a relatively environmentally-friendly underlayment embodiment 100, for example. Use of ground-up tires and/or recycled rubber material may enhance strength, durability, and/or moisture resistance of underlayment embodiment 100, for example.

Woven fabric layer 125 may comprise a fabric bonded to other layers by being spun onto in a particular example. Woven fabric layer 125 may be utilized to provide underlayment embodiment 100 with relatively good strength characteristics. In one embodiment, woven fabric layer 125 may comprise a fiberglass mesh and/or polyester cloth combination to result in a product which may be relatively difficult to tear. For example, use of a fiberglass mesh may improve tensile strength and/or tear strength for woven fabric layer 125 and, therefore of underlayment embodiment 100 as a whole.

A surface of underlayment embodiment 100, such as of first non-woven layer 105, may be neither smooth nor granulated (e.g., formed of grains or particles, and/or having a rough surface). For example, if a roofer (e.g., roofing contractor) was to stand on a relatively steep roof, such as a roof with a 12-12 pitch, it may be too slippery (e.g., have too low of a coefficient of friction) to safely support a typical body weight of a roofer. However, a surface of an underlayment embodiment 100 may provide a safer work environment in which a roofer may more safely stand even while on a relatively steep roof. For example, a non-woven fabric layer 105 may have a relatively high coefficient of friction to thereby reduce a possibility of slippage of a roofer. Moreover, underlayment embodiment 100 may be walkable, at least in part as a result of first non-woven fabric layer 105, which may provide relative stiffness and/or strength to a water resistant underlayment embodiment.

Figure 2:
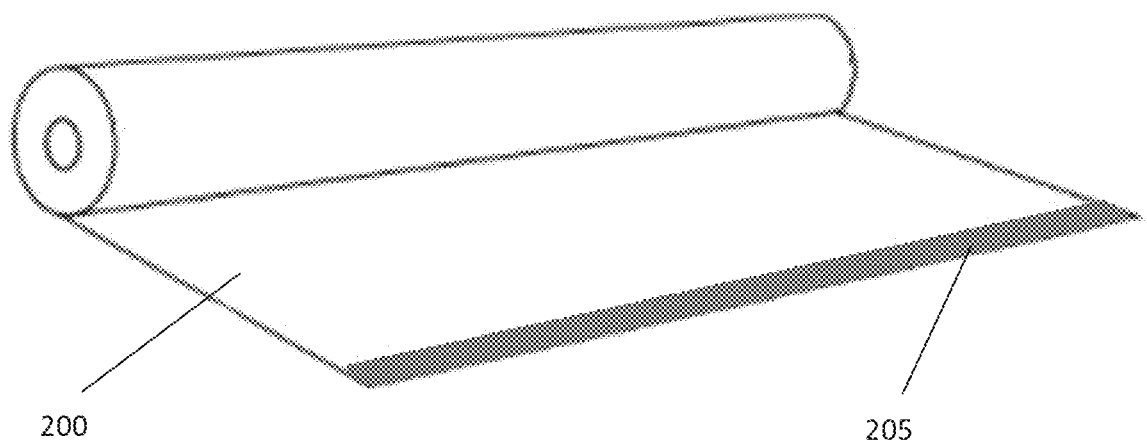
FIG. 2 illustrates a roll of a water resistant underlayment according to an embodiment.

FIG. 2 illustrates an embodiment 200 of an underlayment. For example, embodiment 200 may comprise a roll of underlayment embodiment 100 discussed above with respect to FIG. 1. A roofer (e.g., roofing contractor or other roofing installation person) installing an underlayment, such as an embodiment, may place roll embodiment 200 on a surface of a building structure with respect to which roofing is to be installed. As discussed above, a surface of an underlayment embodiment may comprise a bituminous layer which may adhere to a surface of a building structure. In an embodiment, a thin film, such as a sheet of plastic cellophane, for example, may be disposed on a layer, such as a bituminous layer and the sheet may be removed to expose the bituminous layer, as discussed further below with respect to FIG. 3. A roofer may unroll roll embodiment 200 and remove the thin film so that bituminous layer, in this example, adheres to a surface of the structure. Accordingly, underlayment embodiment may be installed with relative ease by a roofer.

In an example implementation, roll embodiment 200 may comprise 220 square feet of water resistant underlayment, which may weigh approximately 45-50 lbs. Given its relatively light weight, roll embodiment 200 may be readily handled by a roofer for installation purposes, for example.

If a surface, such as a plywood surface, for example, onto which an underlayment embodiment is to be placed is relatively large and/or long, more than one roll of roll embodiment 200 may be utilized. For example, for more than one roll, separate unrolled rolls of underlayment may overlap to some extent. In an example embodiment for a roof having a relatively shallow pitch, a first unrolled roll of underlayment may be adhered to a surface of a roof and then a second unrolled roll of underlayment may be adhered to an exposed or top surface of the first unrolled roll of underlayment. In an example, a top surface of a non-woven fabric layer of a first unrolled roll of underlayment may comprise a granulated material and a bottom surface of a second unrolled roll of underlayment may be placed on top of the top of the first unrolled roll so that, e.g., the granulated top surface of the first unrolled roll is adhered to a bottom surface, such as a second bituminous surface of a second unrolled roll. To adhere a top surface of a first unrolled roll to a bottom surface of a second unrolled roll, a roofer may position the second unrolled roll on top of at least a portion of the first unrolled roll and then apply pressure (e.g., weight), such as by physically stepping (e.g., walking) on the second unrolled roll so that a bottom surface of the second unrolled roll is able to adhere to a top surface of the first unrolled roll, for example.

If a roof has a relatively steep pitch, a release strip of material may be utilized on a top surface of a first unrolled roll of underlayment, e.g., to assist a roofer to adhere a bottom surface of a second unrolled roll of underlayment to the top surface of the first unrolled roll of underlayment. For example, if a roof has a relatively steep pitch, it may not be safe for a roofer to directly step (e.g., walk) on a second unrolled roll of underlayment to adhere the second unrolled roll of underlayment to a first unrolled roll of underlayment. Thus, to produce an adequate seal between successive unrolled rolls, an underlayment embodiment may be utilized which includes a strip 205 of material, shown in FIG. 2, on a surface of one or both ends of the underlayment. For example, strip 205 of material may be included adjacent to (e.g., on top of a first non-woven fabric layer), such as shown in embodiment 200 illustrated in FIG. 2. In an example embodiment, strip 205 may comprise a portion of underlayment, but may omit a first non-woven fabric layer and a film layer, such as embodiment 100 shown in FIG. 1. Instead, for an underlayment embodiment, first and/or second bituminous layers, a woven fabric layer, and a second non-woven fabric, for example, may be included. By omitting a first non-woven fabric layer and a film layer to form strip 205, for example, thickness along strip 205 may be reduced and may produce adhesion between successive unrolled rolls with fewer layers than embodiment 100 uses to adhere to a surface of a building structure, for example. In one particular implementation, strip 205 may adhere to a strip of underlayment along one or more edges on a successive unrolled roll of underlayment. For example, an underlayment embodiment may include a strip 205 located along one or more edges of underlayment, such as along length and/or width directions. In one particular implementation, an underlayment embodiment may conform to a shape of a roof and may therefore be useful in a "valley" of a roof, such as where two opposing sloped portions of a roof meet, in a manner that may reduce risk of creating an air pocket.

Strip 205 may comprise a width of approximately two inches of an edge of an unrolled roll, in an embodiment. Strip 205 may comprise an adhesive instead of a non-woven layer and glue filament, in an embodiment, to form a double seal for overlapping sheets (e.g., unrolled rolls of water resistant underlayment). For example, an adhesive may comprise a material different or distinct from a bituminous layer. In other words, as a roof is covered with underlayment, there may be about two inches of overlap between successive sheets of underlayment being laid out. Accordingly, an underlayment may therefore provide adhesion to a surface of a roof, such as plywood, and strip 205 may provide adhesion on a top surface of a successive underlayment (e.g., for the overlapping portion for successive underlayments). In an embodiment, use of strip 205 to form a seal in such a manner may therefore make it less likely for water to blow into a house, such as between shingles of having a relatively shallow roof, for example. Moreover, an embodiment forming a double seal, as previously described, may make it less likely for material of a bituminous layer, such as tar and/or asphalt, to bleed between underlayments on a hot day as well.

In some implementations, as discussed above, an underlayment may comprise a double sheet (e.g., one sheet on another sheet, such as one sheet like embodiment 100 and another). In some implementations, three or more underlayment sheets may be utilized. If a roof has a relatively shallow pitch (e.g., incline), water may occasionally pool in certain locations, such as during winter months (e.g., ice) may effectively form a dam in certain locations and some ice may begin to melt, such as from heat rising from below an underlayment and/or from temperature fluctuations, for example. Thus, to reduce risk of leakage, a first underlayment sheet may be placed on a plywood surface and a second underlayment sheet may be placed on the first underlayment sheet. In certain jurisdictions, for example, an embodiment having two or more underlayment sheets may be utilized in order to meet building code regulations for a roof having a slope with a shallower pitch than 4/12. For example, two or more underlayment sheets may be specified where one of the layers is to handle ice and water.

In general, for a relatively low sloped roof, an underlayment comprising a double sheet, as previously described, may provide a relatively effective technique to reduce or even eliminate moisture penetration. In another embodiment, underlayment embodiment 100, such as discussed above with respect to FIG. 1, may include a type of tar paper as a second sheet instead of a second underlayment sheet, as was previously described.

A 4/12 pitch for a roof refers to a roof which rises 4 inches in height for every 12 inches, as measured horizontally from the edge of the roof to the centerline. A 4/12 pitch for a roof may comprise a relatively low-pitched roof. Previously described double sheet embodiment of an underlayment may be utilized on a relatively low-pitched roof, such as a 4/12 pitch roof.

Although a lot of roofing comprises wood, roofing may also certain types of metal. An underlayment embodiment may be utilized to prevent or reduce an incidence of condensation, such as from the metal of a roof becoming hot or cold as temperature fluctuates.

One layer of water resistant underlayment may be used on a portion of a roof around an eave. An "eave," as used herein refers to an edge of a roof which overhangs a face of a wall. An eave may project beyond a side of a building, e.g., to form an overhang to allow water to be thrown clear of walls of a building. In an embodiment, one layer of water resistant underlayment may be placed around an eave, and a second layer may be placed inside a heated space or area, such as two feet or so within the heated space.

A bituminous layer comprising tar or asphalt may form a water resistant seal along with a second layer of water resistant underlayment. As discussed above, a bituminous layer may help to seal nails.

For a northern climate, an underlayment embodiment, such as a double sheet (e.g., for shallow roofs) or single sheet (e.g., for steep roofs) under shingles, may prevent or otherwise reduce occurrence of snow melting and freezing to form ice which may harm a roof. Rather, an underlayment embodiment, such as discussed above, may insulate a material, such as plywood, in a manner so that a cold temperature may remain above the plywood material and heat may rise from a building structure potentially to keep the plywood material warm. Thus, as suggested, in an embodiment, an underlayment may provide insulation. For example, temperature inside a house may reach 75 degrees or so while external temperatures outside may be much cooler, such as during winter months.

An underlayment embodiment may be utilized around areas with risk of moisture penetration, such as a chimney flu. For example, an underlayment embodiment may be adhered to masonry of a chimney. Likewise, an underlayment embodiment may be utilized to provide a seal for openings in a roof, such as around skylights, for example, to reduce or prevent moisture penetration.

Figure 3:
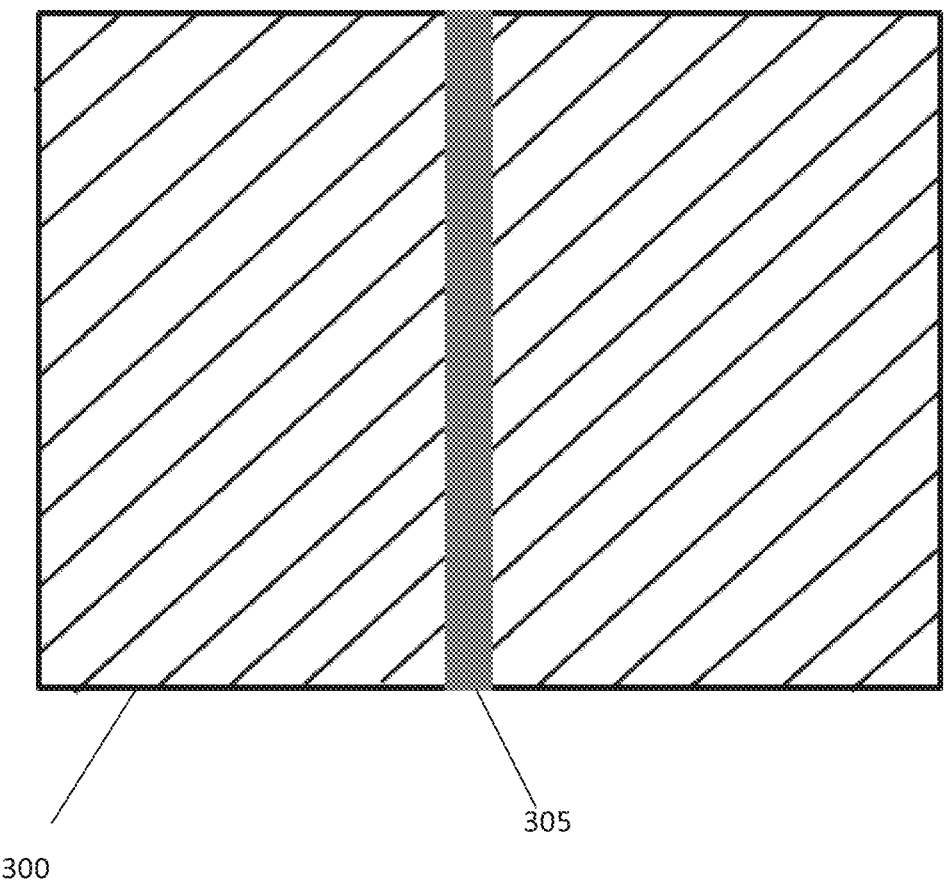
FIG. 3 illustrates a surface of a water resistant underlayment according to an embodiment.

FIG. 3 illustrates a surface of an underlayment embodiment 300. A surface of underlayment embodiment 300 may initially be covered by a cellophane material, for example. A cellophane material may be peeled away to reveal a surface of a bituminous layer, such as second bituminous layer 130 shown in FIG. 1 and as discussed above. A bituminous layer may comprise a relatively sticky surface which may adhere to a plywood surface or some other surface of a material of a structure, such as a brick or a stone surface. In one particular embodiment, an adhesive material may be used with a bituminous layer to enhance or improve adhesion between a surface of underlayment embodiment 300 and a surface of a roof. If underlayment embodiment 300 has been unrolled, such as from roll embodiment 200 shown in FIG. 2, a roofer may subsequently remove a cellophane material to expose a bituminous layer and/or a separate adhesive layer, which may subsequently be positioned such as on a surface, as previously described. Underlayment embodiment 300, as shown in FIG. 3, may include a so-called "double release strip" 305, which may allow a roofer to remove cellophane from approximately half of a surface of a sheet of an underlayment embodiment to expose a bituminous layer and/or a separate adhesive layer, instead of exposing an entire surface of a sheet. Accordingly, a roofer may utilize double release strip 305 for relatively more convenient installation. For example, a roofer may position a partially exposed surface more easily. Subsequent to satisfactory positioning of an underlayment embodiment, a roofer may remove the remaining cellophane from the underlayment embodiment sheet to expose a remaining portion thereof, after which the roofer may permit the remainder to also adhere to a chosen position on a surface, such as a plywood surface. Double release strip 305 may therefore be beneficial to a roofer contractor by allowing him or her to more conveniently position an underlayment embodiment prior to adhering to a surface. For example, in an embodiment where a roofer is adhering underlayment to a valley of a roof, the roofer may pull one side of double release strip 305 off at a time.

Figure 4:
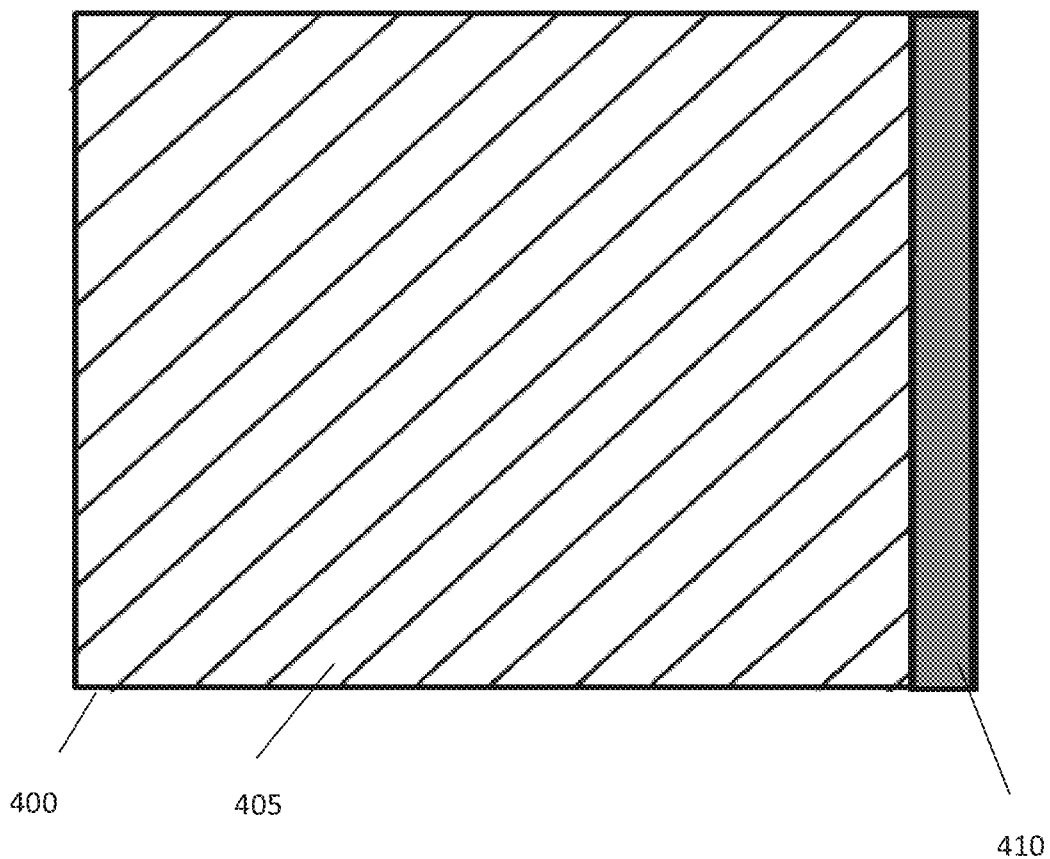
FIG. 4 illustrates a surface of a water resistant underlayment according to an embodiment.

FIG. 4 illustrates an underlayment embodiment 400. FIG. 4 illustrates an underlayment embodiment 400 positioned with a non-woven fabric layer 405, where the non-woven fabric layer 405 may be similar to first non-woven fabric layer 105 of FIG. 1, as discussed previously above. Underlayment embodiment 400 may include a strip 410. Strip 410 may be similar to strip 205 of FIG. 2, as discussed previously above. In one particular implementation, strip 410 of underlayment embodiment 400 may adhere to an overlapping strip on a successive underlayment sheet.

Figure 5:
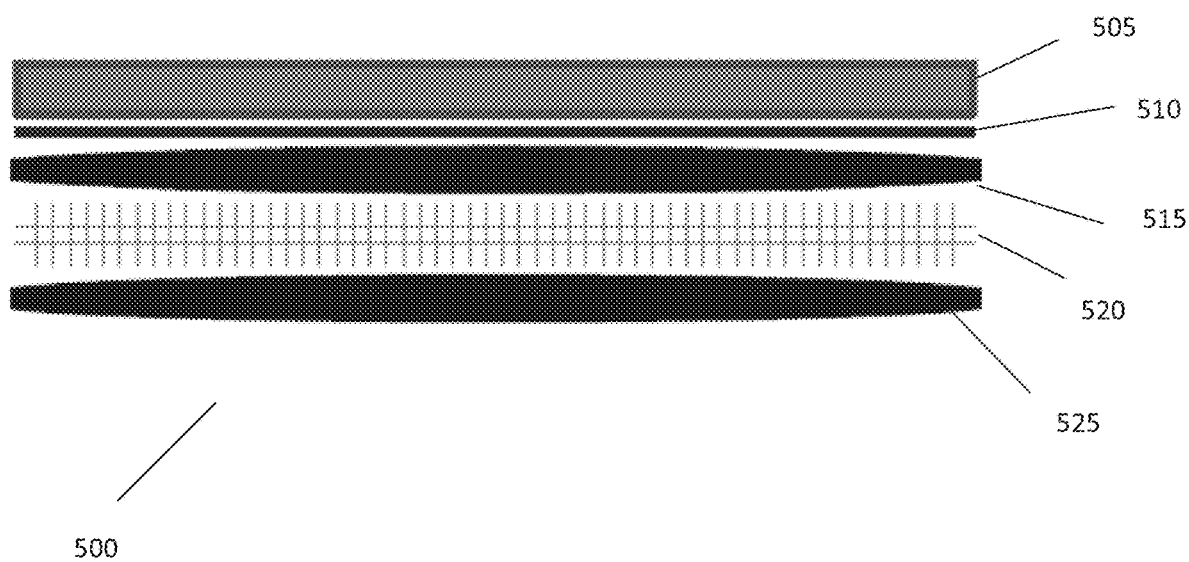
FIG. 5 illustrates a water resistant underlayment according to an embodiment.

FIG. 5 illustrates an underlayment embodiment 500. Underlayment embodiment 500 may include several layers, as shown in FIG. 5. FIG. 5 illustrates an underlayment embodiment 500 that may include a non-woven fabric layer 505, a film layer 510, a first bituminous material layer 515, a woven fabric layer 520, and a second bituminous layer 525.

Underlayment embodiment 500 of FIG. 5 is similar to underlayment embodiment 100 of FIG. 1 except for an omission of a second non-woven fabric layer, such as second non-woven fabric layer 120, as shown in FIG. 1. By omitting a second non-woven fabric layer, for example, underlayment embodiment 500 may be manufactured and/or employed so as to potentially provide a reduced thickness, weight, and/or cost.

It is noted that the order or arrangement of layers as shown in FIG. 5 is merely one example embodiment, and that layers may be arranged in a different order, for example, in other embodiments. Moreover, in one or more embodiments, additional layers of material may be included while remaining within claimed subject matter scope.

For convenient illustration, various layers of an underlayment embodiment 500 are shown in FIG. 5 as having a similar and relatively uniform thickness. However, in other embodiments relative thicknesses of different layers may differ based, at least in part, on a particular application, for example.

Figure 6:
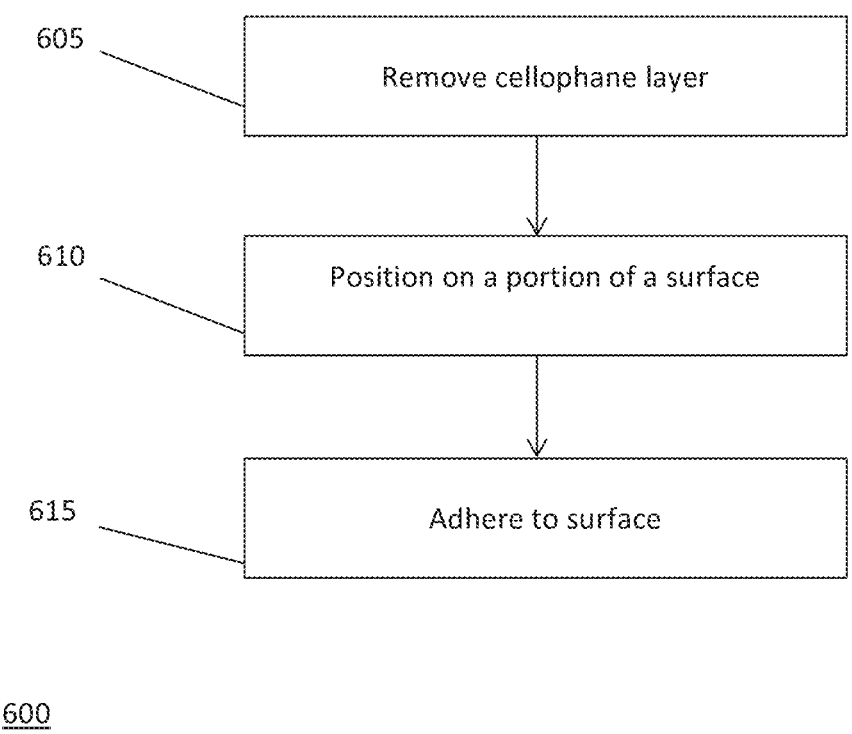
FIG. 6 a flow diagram of a method for installing a water resistant underlayment according to an embodiment.

FIG. 6 a flow diagram 600 of a method embodiment for installing an underlayment embodiment. Embodiments in accordance with claimed subject matter may include all of, less than, or more than blocks 605-615. Also, the order of blocks 605-615 is merely an example order. At operation 605, a roofer may remove a cellophane layer, such as discussed above with respect to FIGS. 1-3. At operation 610, a roofer may position an underlayment embodiment on a portion of surface of a building or structure. At operation 615, a roofer may employ an underlayment to adhere to a surface of structure, as previously described.

Figure 7:
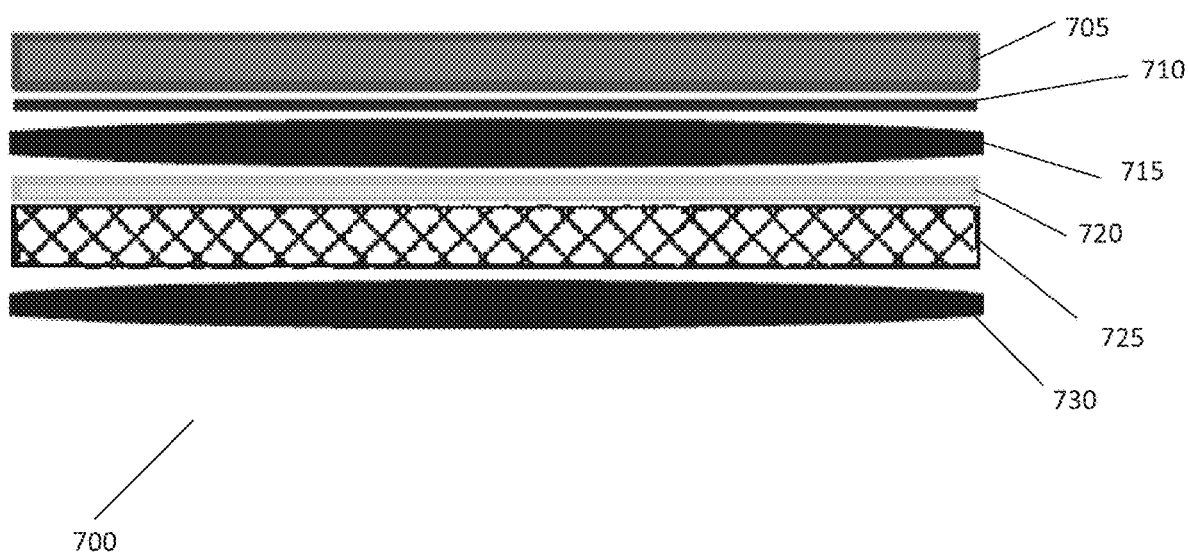
FIG. 7 illustrates a water resistant underlayment according to an embodiment.

FIG. 7 illustrates an embodiment 700 of a water resistant underlayment. Embodiment 700 may include several layers, such as illustrated, in which an embodiment 700 consists of, consists essentially of, or alternatively, includes a first non-woven fabric layer 705, a film layer 710, a first bituminous material layer 715, a second non-woven fabric layer 720, a fiberglass mesh layer 725, and a second bituminous layer 730. Of course, an order or arrangement of layers, as shown in FIG. 7, is merely one example embodiment, and layers may be arranged in a different order, for example, in some embodiments. Moreover, in one or more embodiments, additional layers of material may be included consistent with claimed subject matter scope.

First non-woven fabric layer 705, film layer 710, first bituminous material layer 715, second non-woven fabric layer 720, and second bituminous layer 730 may comprise materials similar to those of first non-woven fabric layer 105, film layer 110, first bituminous material layer 115, second non-woven fabric layer 120, and second bituminous layer 130, respectively, as discussed above with respect to embodiment 100 shown in FIG. 1, for example.

Fiberglass mesh layer 725 may comprise a glass-fiber reinforcing fabric, such as a web, for example. Use of a fiberglass mesh layer 725 in an embodiment 700 of a water resistant underlayment may, for example, improve tensile strength and/or tear strength, improve a durability and/or moisture resistance of the water resistant underlayment. For example, use of a fiberglass mesh may improve tensile strength and/or tear strength for woven fabric layer 125 and, therefore, of underlayment embodiment 100 as a whole.

Figure 8:
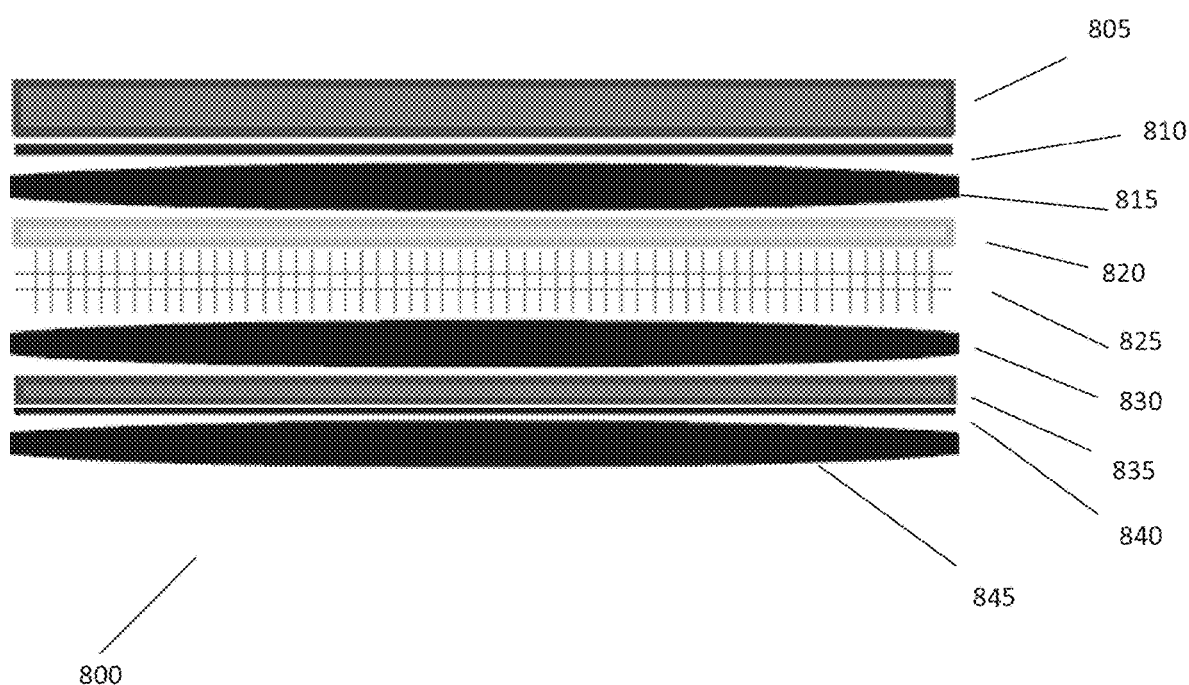
FIG. 8 illustrates a water resistant underlayment according to an embodiment.

FIG. 8 illustrates an embodiment 800 of a water resistant underlayment. Embodiment 800 may include several layers, such as illustrated, in which an embodiment 800 consists of, consists essentially of, or alternatively, includes a first non-woven fabric layer 805, a first film layer 810, a first bituminous material layer 815, a second non-woven fabric layer 820, a woven fabric layer 825, a second bituminous layer 830, a third non-woven fabric layer 835, a second film layer 840, and a third bituminous layer 845. Of course, an order or arrangement of layers, as shown in FIG. 8, is merely one example embodiment, and layers may be arranged in a different order, for example, in some embodiments. Moreover, in one or more embodiments, additional layers of material may be included consistent with claimed subject matter scope.

First non-woven fabric layer 805, film layer 810, first bituminous material layer 815, second non-woven fabric layer 820, woven fabric layer 825, and second bituminous layer 830 may comprise materials similar to those of first non-woven fabric layer 105, film layer 110, first bituminous material layer 115, second non-woven fabric layer 120, woven fabric layer 125, and second bituminous layer 130, respectively, as discussed above with respect to embodiment 100 shown in FIG. 1, for example.

Third non-woven fabric layer 835, second film layer 840, and third bituminous layer 845 may be utilized in embodiment 800 to increase a thickness of underlayment, for example, to improve a durability and/or moisture resistance of the water resistant underlayment. Use of an underlayment having three non-woven layers, such as shown in embodiment 800 of underlayment, may improve a seal for fasteners. Use of an underlayment having three non-woven layers may also provide additional insulation value, such as if used on a roof eave in a cold climate in a presence of ice and/or water, for example.

One or more underlayment embodiments as discussed above may comply with American Section of the International Association for Testing Materials (ATSM) International standards, such as ASTM D1970/D1970M-17a and/or ASTM D226/D226M-17, available from the American Section of the International Association for Testing Materials in West Conshohocken, Pa. ASTM D1970/D1970M-17a comprises a standard for self-adhering polymer modified bituminous sheet materials for steep roofing underlayment for ice dam protection. ASTM D226/D226M-17 comprises a standard for asphalt-saturated organic felt for roofing and waterproofing.

In the present patent application, in a particular context of usage, such as a situation in which tangible components (and/or similarly, tangible materials) are discussed above, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under," as used herein, are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes an underlayment embodiment, as one illustration, in which, for example, orientation at various times (e.g., during fabrication or application) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

It is further noted that the terms "type" and/or "like," as used herein, such as with a feature, structure, characteristic, and/or the like, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," if the minor variations are sufficiently minor so that the feature, structure, characteristic, and/or the like would still be considered to be substantially present with such variations also present. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An article comprising: a water resistant underlayment portion, wherein the water resistant underlayment portion consists essentially of:
   a first non-woven fabric layer,
   a first bituminous material layer comprising at least one of asphalt or tar,
   a film layer comprising at least one of a glue layer or a plastic layer, the film layer to be disposed between the first bituminous material layer and the first non-woven fabric layer, and the film layer to:
      form a bond between the first non-woven fabric layer and the first bituminous material layer, and
      reduce bleeding of the at least one of asphalt or tar from the first bituminous material layer to the first non-woven fabric layer,
   a second non-woven fabric layer,
   a woven fabric layer, and
   a second bituminous material layer;
   wherein the second bituminous layer has a surface to adhere to an exposed surface of a structural building.

2. The article of claim 1, wherein the woven fabric layer comprises at least one of: a fiberglass mesh or a polyester cloth.

3. The article of claim 1, wherein the woven fabric layer has a polyester cloth.

4. The article of claim 1, wherein a roof of the structural building is to include the exposed surface of the structural building.

5. The article of claim 4, wherein the roof is to have a relatively shallow pitch.

6. The article of claim 1, further comprising a cellophane layer to cover the second bituminous layer, the cellophane layer being removable to expose the surface of the second bituminous layer, the surface thereof being able to adhere to the surface of the structural building.

7. The article of claim 6, wherein the cellophane layer comprises a double release strip to selectively remove two non-contiguous portions of the cellophane layer.

8. The article of claim 1, wherein the film layer is formed from a glue to provide a relatively water resistant barrier.

9. The article of claim 1, wherein the second bituminous layer has an adhesive material disposed on the surface to adhere to the exposed surface of a structural building.

10. The article of claim 1, wherein at least a portion of at least one of the first bituminous material layer or the second bituminous material layer comprises recycled rubber material.

11. An article comprising: a water resistant underlayment portion, wherein at least a strip of the water resistant underlayment portion consists essentially of:
   a first non-woven fabric layer,
   a first bituminous material layer comprising at least one of asphalt or tar,
   a film layer comprising at least one of a glue layer or a plastic layer, the film layer to be disposed between the first bituminous material layer and the first non-woven fabric layer, the film layer to:
      form a bond between the first non-woven fabric layer and the first bituminous material layer, and
      reduce bleeding of the at least one of asphalt or tar from the first bituminous material layer to the first non-woven fabric layer,
   a second non-woven fabric layer,
   a woven fabric layer, and
   a second bituminous material layer;
   wherein the second bituminous layer has a surface to adhere to an exposed surface of a structural building.

12. An article comprising: a water resistant underlayment portion, wherein the water resistant underlayment portion consists essentially of:
   a first non-woven fabric layer,
   a first bituminous material layer comprising at least one of asphalt or tar,
   a film layer comprising at least one of a glue layer or a plastic layer, the film layer to be disposed between the first bituminous material layer and the first non-woven fabric layer, the film layer to:
      form a bond between the first non-woven fabric layer and the first bituminous material layer, and
      reduce bleeding of the at least one of asphalt or tar from the first bituminous material layer to the first non-woven fabric layer,
   a second non-woven fabric layer,
   a woven fabric layer,
   a second bituminous material layer, and
   a removable cellophane layer to cover a surface of the second bituminous layer;
   wherein the cellophane layer is a double release strip to selectively remove two non-contiguous portions of the cellophane layer from the second bituminous layer.

13. The article of claim 12, wherein the surface of the second bituminous layer is sufficiently sticky to adhere to a surface of a structural building.

14. The article of claim 13, wherein a roof of the structural building is to include the surface of the structural building.

15. The article of claim 12, wherein the woven fabric layer comprises at least one of: a fiberglass mesh or a polyester cloth.

16. The article of claim 12, wherein the woven fabric layer has a polyester cloth.

17. The article of claim 12, wherein the second bituminous layer has an adhesive material disposed on a surface to adhere to a surface of a structural building.

18. The article of claim 12, wherein at least a portion of at least one of the first bituminous material layer or the second bituminous material layer comprises recycled rubber material.

19. An article comprising: a water resistant underlayment portion, wherein at least a portion of a surface of the water resistant underlayment portion includes a strip consisting essentially of:
   a first bituminous material layer comprising at least one of asphalt or tar,
   a non-woven fabric layer,
   a film layer comprising at least one of a glue layer or a plastic layer, the film layer to be disposed between the first bituminous material layer and the non-woven fabric layer, the film layer to:
      form a bond between the non-woven fabric layer and the first bituminous material layer, and
      reduce bleeding of the at least one of asphalt or tar from the first bituminous material layer to the non-woven fabric layer,
   a woven fabric layer, and
   a second bituminous material layer;

wherein the second bituminous layer has a surface to adhere to an exposed surface of a structural building.

20. An article comprising: a water resistant underlayment portion, wherein the water resistant underlayment portion consists essentially of:
- a first non-woven fabric layer,
- a first bituminous material layer comprising at least one of asphalt or tar,
- a film layer comprising at least one of a glue layer or a plastic layer, the film layer to be disposed between the first bituminous material layer and the first non-woven fabric layer, the film layer to:
  - form a bond between the first non-woven fabric layer and the first bituminous material layer, and
  - reduce bleeding of the at least one of asphalt or tar from the first bituminous material layer to the first non-woven fabric layer,
- a woven fabric layer, and
- a second bituminous material layer;
- wherein the second bituminous layer comprises a surface to adhere to an exposed surface of a structural building.

21. The article of claim 20, wherein the woven fabric layer comprises at least one of: a fiberglass mesh or a polyester cloth.

22. The article of claim 20, wherein the woven fabric layer has a polyester cloth.

23. The article of claim 20, wherein the second bituminous layer has an adhesive material disposed on the surface to adhere to the exposed surface of a structural building.

24. An article comprising: a water resistant underlayment portion, wherein at least a strip of the water resistant underlayment portion consists essentially of:
- a first non-woven fabric layer,
- a first bituminous material layer comprising at least one of asphalt or tar,
- a film layer comprising at least one of a glue layer or a plastic layer, the film layer to be disposed between the first bituminous material layer and the first non-woven fabric layer, the film layer to:
  - form a bond between the first non-woven fabric layer and the first bituminous material layer, and
  - reduce bleeding of the at least one of asphalt or tar from the first bituminous material layer to the first non-woven fabric layer,
- a woven fabric layer, and
- a second bituminous material layer;
- wherein the second bituminous layer has a surface to adhere to an exposed surface of a structural building.

25. The article of claim 24, wherein the second bituminous layer has an adhesive material disposed on the surface to adhere to the exposed surface of a structural building.

26. The article of claim 24, wherein at least a portion of at least one of the first bituminous material layer or the second bituminous material layer comprises recycled rubber material.

27. An article comprising: a water resistant underlayment portion, wherein the water resistant underlayment portion consists essentially of:
- a first non-woven fabric layer,
- a first bituminous material layer comprising at least one of asphalt or tar,
- a film layer comprising at least one of a glue layer or a plastic layer, the film layer to be disposed between the first bituminous material layer and the first non-woven fabric layer, the film layer to:
  - form a bond between the first non-woven fabric layer and the first bituminous material layer, and
  - reduce bleeding of the at least one of asphalt or tar from the first bituminous material layer to the first non-woven fabric layer,
- a second non-woven fabric layer,
- a fiberglass mesh layer, and
- a second bituminous material layer;
- wherein the second bituminous layer has a surface to adhere to an exposed surface of a structural building.

28. An article comprising: a water resistant underlayment portion, wherein the water resistant underlayment portion consists essentially of:
- a first non-woven fabric layer,
- a first bituminous material layer comprising at least one of asphalt or tar,
- a first film layer comprising at least one of a glue layer or a plastic layer, the first film layer to be disposed between the first bituminous material layer and the first non-woven fabric layer, the first film layer to:
  - form a bond between the first non-woven fabric layer and the first bituminous material layer, and
  - reduce bleeding of the at least one of asphalt or tar from the first bituminous material layer to the first non-woven fabric layer,
- a second non-woven fabric layer,
- a woven fabric layer,
- a second bituminous material layer,
- a third non-woven fabric layer,
- a second film layer,
- a third bituminous material layer;
- wherein the third bituminous layer has a surface to adhere to an exposed surface of a structural building.

* * * * *